Figure 1:
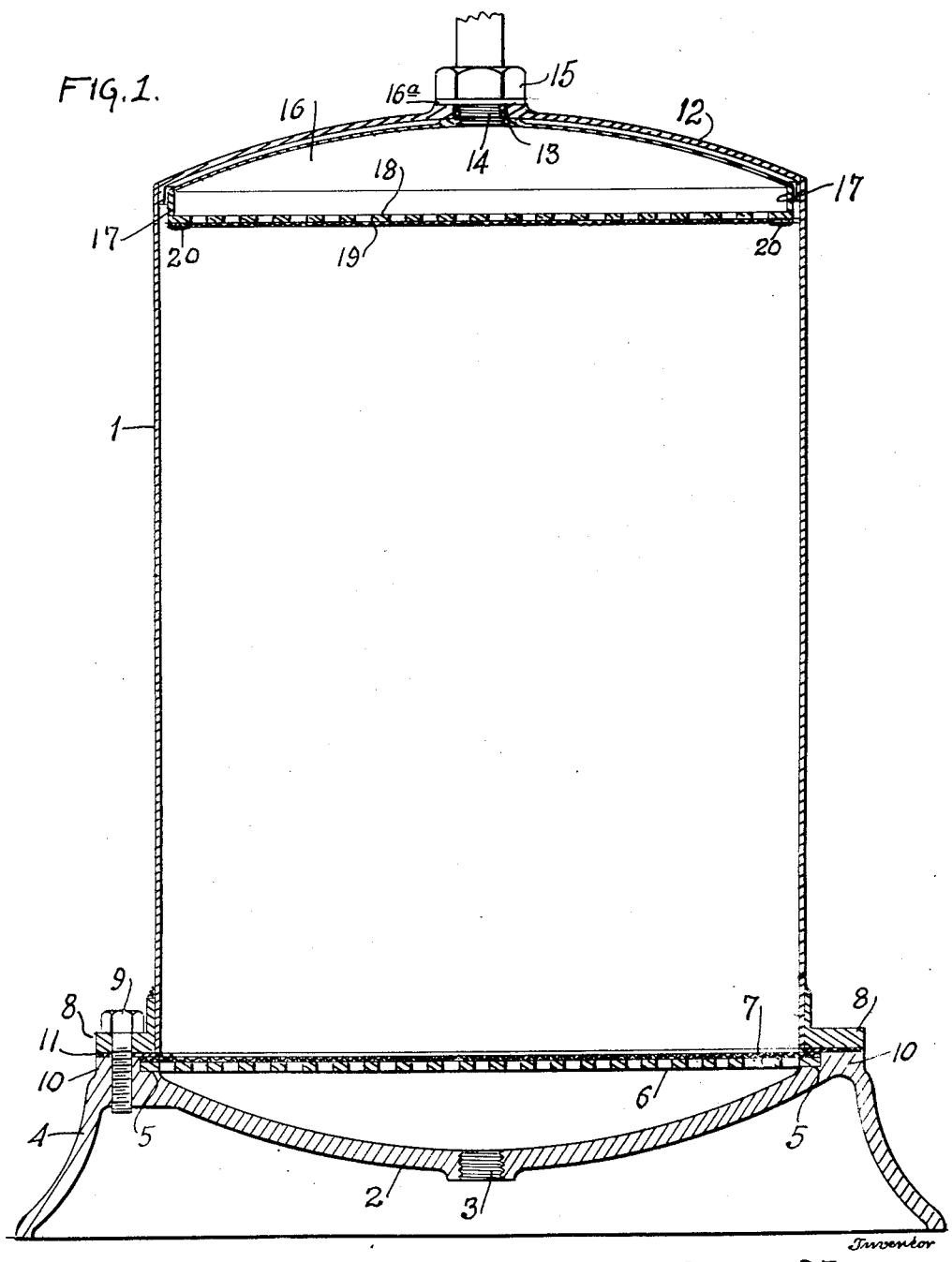

Jan. 11, 1927.　　　C. P. EISENHAUER　　　1,613,746

TANK

Filed Oct. 12, 1925　　　2 Sheets-Sheet 1

CHARLES P. EISENHAUER

Jan. 11, 1927.   
C. P. EISENHAUER   
1,613,746

TANK

Filed Oct. 12, 1925   2 Sheets-Sheet 2

Inventor
CHARLES P. EISENHAUER,
By Toulmin & Toulmin,
Attorneys

Patented Jan. 11, 1927.

1,613,746

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

TANK.

Application filed October 12, 1925. Serial No. 61,995.

My invention relates to tanks and in particular to the mounting of screens therein to retain granulated material.

It is the object of my invention to provide means of mounting a screen between the bottom and side walls of a tank to retain the screen in position and to enable the tank to be galvanized in separate parts prior to the installation of the screen.

It is a further object to provide a suspended screen in one end of the tank which may be easily attached and suspended therein without the necessity of permanently attaching the screen to the side walls or end of the tank.

Figure 2:
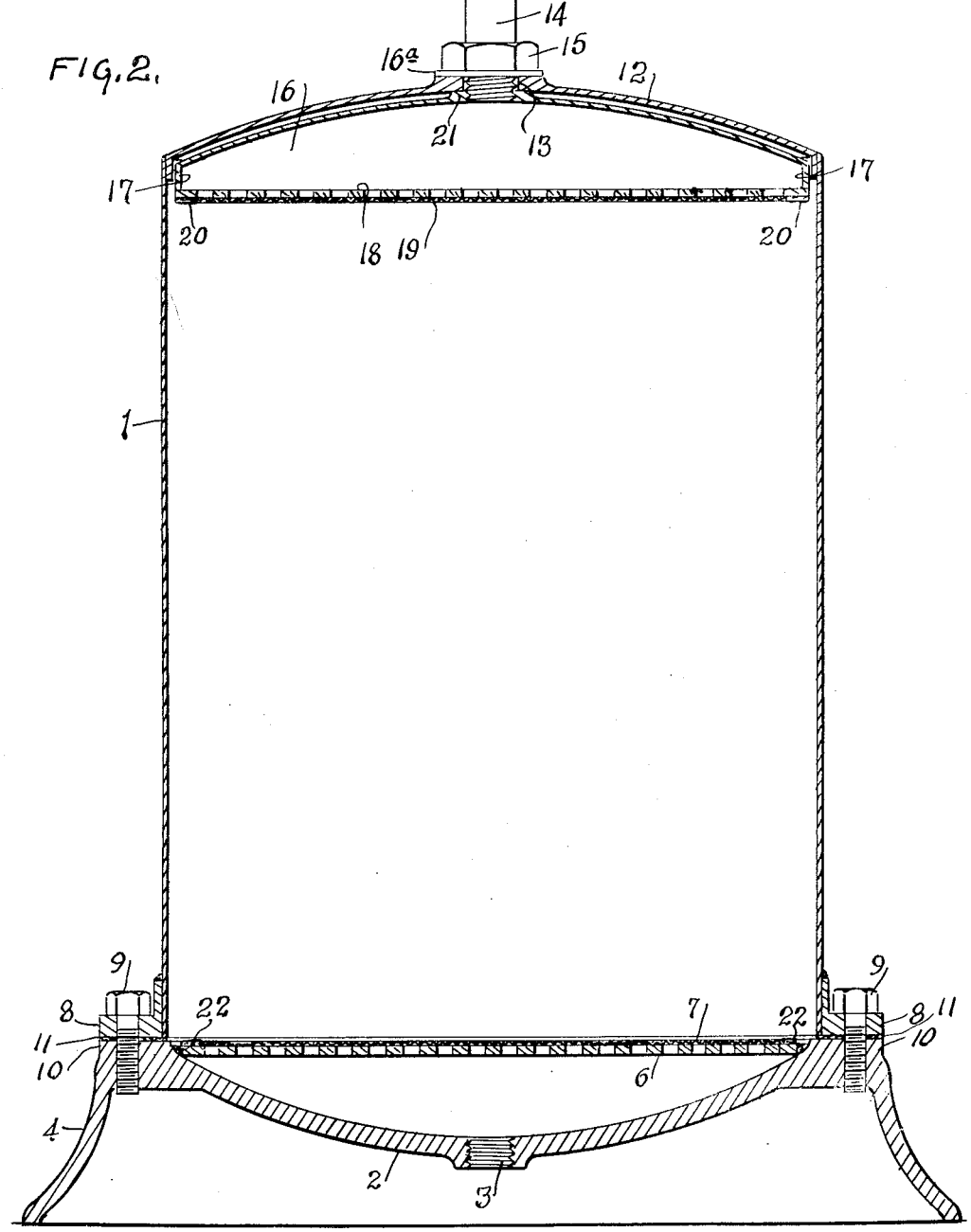

Referring to the drawings:

Figure 1 is a section through a tank showing the installation of such screens; and Figure 2 is a view showing a modified form of installation of such screens.

Referring to the drawings in detail, 1 is the side wall of a tank, preferably cylindrical. The base of the tank consists of an end portion 2 having an opening 3 and a downwardly and outwardly extending supporting flange 4 acting as a support for the tank. The outer margin of the end 2 is provided with a recessed portion 5 in which is mounted a grating 6. On the grating is mounted a screen 7 preferably of Monel metal. The tank wall 1 rests on this screen, the lower end of the wall being provided with a heavy collar 8 which is bolted by the bolts 9 to the flange or collar 10 on the periphery of the end 2 where such collar joins the flange 4 to the end 2.

Interposed between the side walls 1 of the tank and the screen is a gasket 11.

In the upper end of the tank is a top 12 having an opening 13 therein, through which projects a tubular member 14 which is threaded into a nut 15 carried on a gasket 16ª on top of the top 12. This tubular member 14 carries on its lower end a bell-shaped member 16 which has side flanges 17, upon which there is mounted a grating 18 and a screen 19 preferably by welding at the edges of the screen and grating. The welding takes place at 20.

This bell-shaped member 16 is provided with shoulders 21 which engage with the bottom of the top 12, so that the top is embraced between the nut 15, gasket 16 and such shoulders 21. Thus, the upper screen 19 is detachably suspended in the tank. It may be removed by being lowered and taken out of the lower end of the tank when the tank is detached from its support on the lower end of the tank 2.

As will be seen in Figure 2, the lower screen is not embraced between the ends of the tank and the supporting bottom, but the screen and its grating are welded into the bottom of the tank 2 by the weld 22.

It will be understood that I desire to comprehend within my invention such modifications as may be necessary to adapt it to varying conditions and uses.

Having thus fully described my invention, what I claim as new and desire to secure by Letters Patent, is:

1. In a tank, a side wall, a rounded bottom, means of detachably attaching said side wall on said bottom and an upper end for said tank, a flat grating welded within said bottom but spaced therefrom save at its periphery, a screen welded in its margin on said grating whereby the tank proper on the one end and the bottom, grating and screen on the other are separable units.

2. In a tank, a top wall, a side wall and a bottom, a bell suspended in the top closely adjacent thereto and to the side walls thereof to prevent the passage of material therearound, and a screen over the mouth of said bell to prevent the exit of material from said tank while permitting the exit of fluid therefrom, and a flat grating welded within said bottom but spaced therefrom, a screen welded on its margin in said grating, said bottom being detachable from the side walls.

In testimony whereof, I affix my signature.

CHARLES P. EISENHAUER.